United States Patent

Moore

[15] 3,649,200

[45] Mar. 14, 1972

[54] METHOD FOR ANALYSIS OF LARGE POLYMER MOLECULES

[72] Inventor: John C. Moore, Lake Jackson, Tex.
[73] Assignee: The Dow Chemical Company, Midland, Mich.
[22] Filed: Nov. 26, 1969
[21] Appl. No.: 880,121

[52] U.S. Cl. ...................23/230 R, 23/230 A, 23/253 R, 23/253 A, 73/61.1 C
[51] Int. Cl. .................................G01n 11/06, G01n 15/00
[58] Field of Search.................23/230, 253; 73/61.1, 61.1 C

[56] References Cited

OTHER PUBLICATIONS

Snyder, " Determination of Asphalt Molecular Weight Distributions by Gel Permeation Chromatography," Analytical Chemistry, Vol. 41, No. 10, August 1969. pages 1223–1227.

*Primary Examiner*—Morris O. Wolk
*Assistant Examiner*—R. E. Serwin
*Attorney*—Griswold & Burdick, Raymond B. Ledlie and A. Cooper Ancona

[57] ABSTRACT

Method of gel permeation chromatography, especially relating to the analysis of polymers. The method comprises introducing a sample of a dilute solution of the polymer into a chromatographic column and measuring the volume and concentration of the eluate. The sample volume must be of a size sufficient to produce a rise in concentration of polymer in the eluate of from zero to that of the sample. The molecular size distribution of the polymer may then be determined from the measurements taken.

6 Claims, 7 Drawing Figures

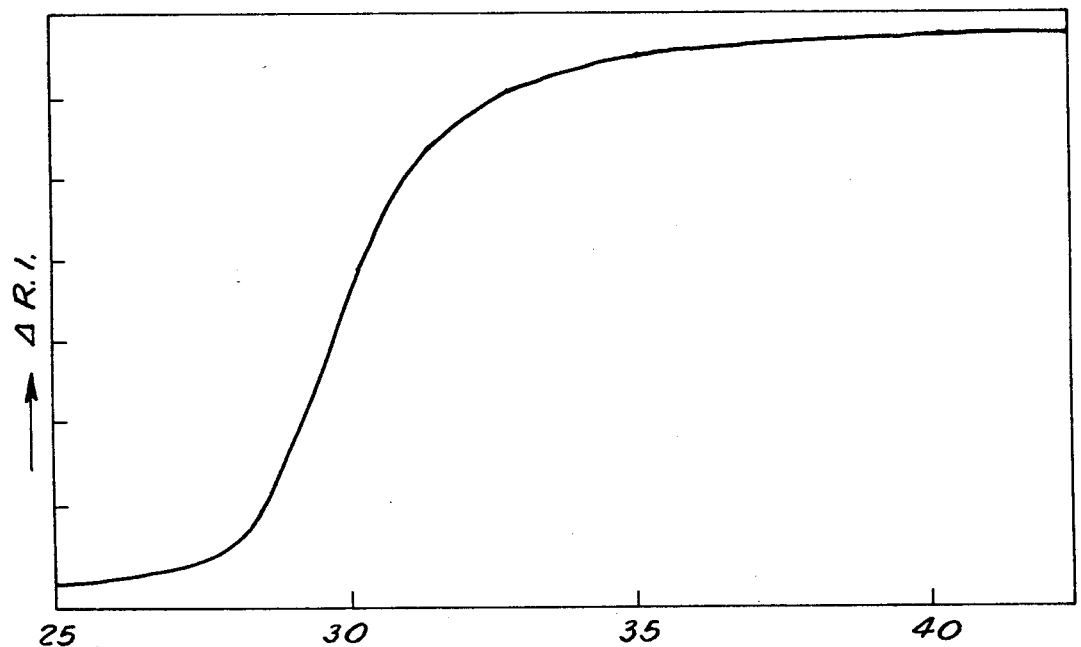
Fig. 1 FRONTAL TRACE OF ELUTION CURVE FROM LARGE SAMPLE
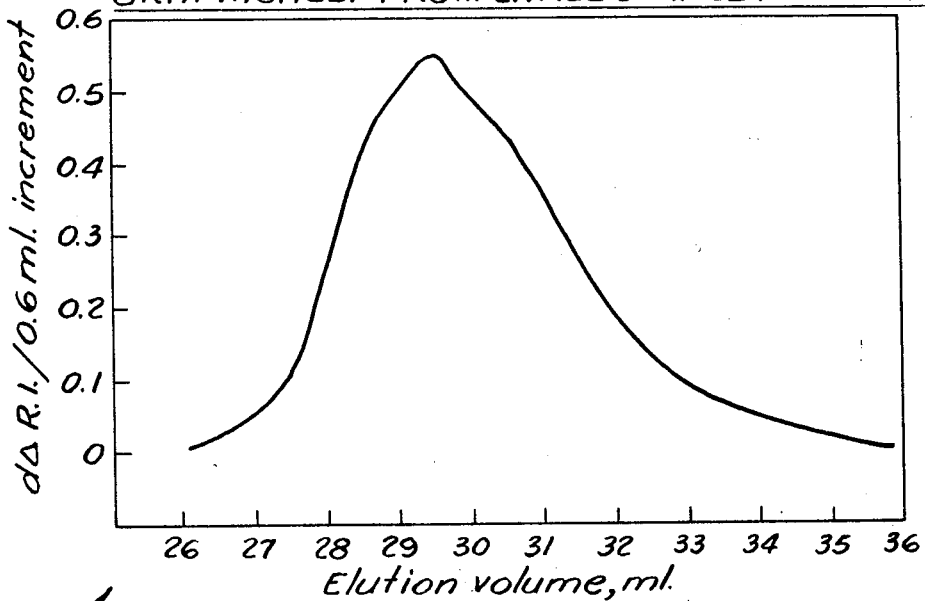
Fig. 2A DIFFERENTIAL ELUTION CURVE DERIVED GRAPHICALLY FROM LARGE SAMPLE FRONTAL TRACE

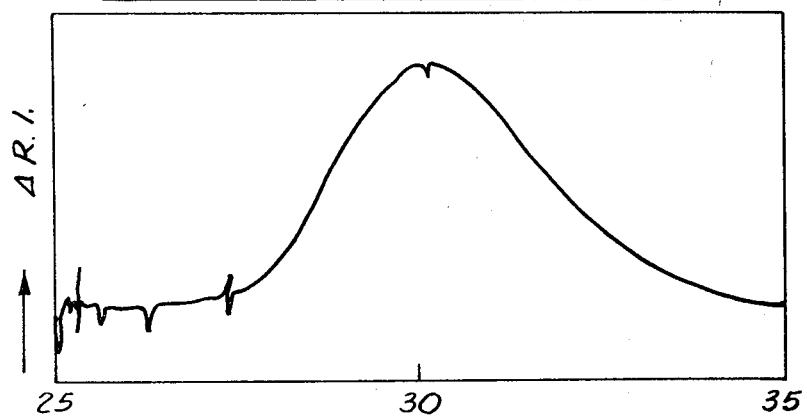
Fig. 2B — Small sample elution curve of single component
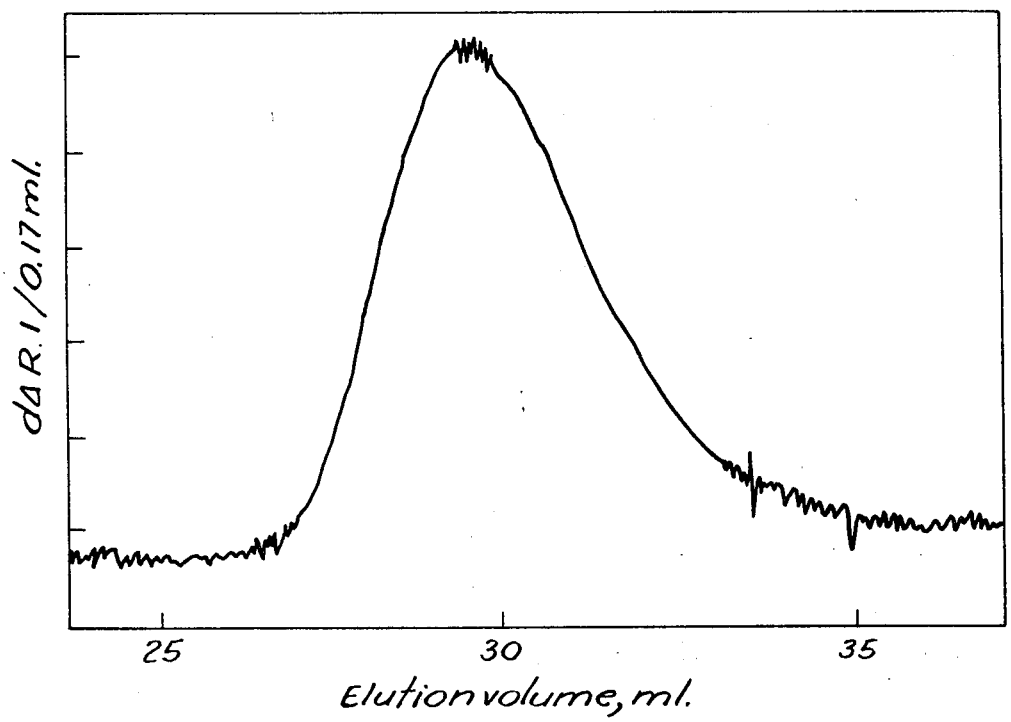
Fig. 3 — Refractometer differentiated elution curve from large sample frontal trace

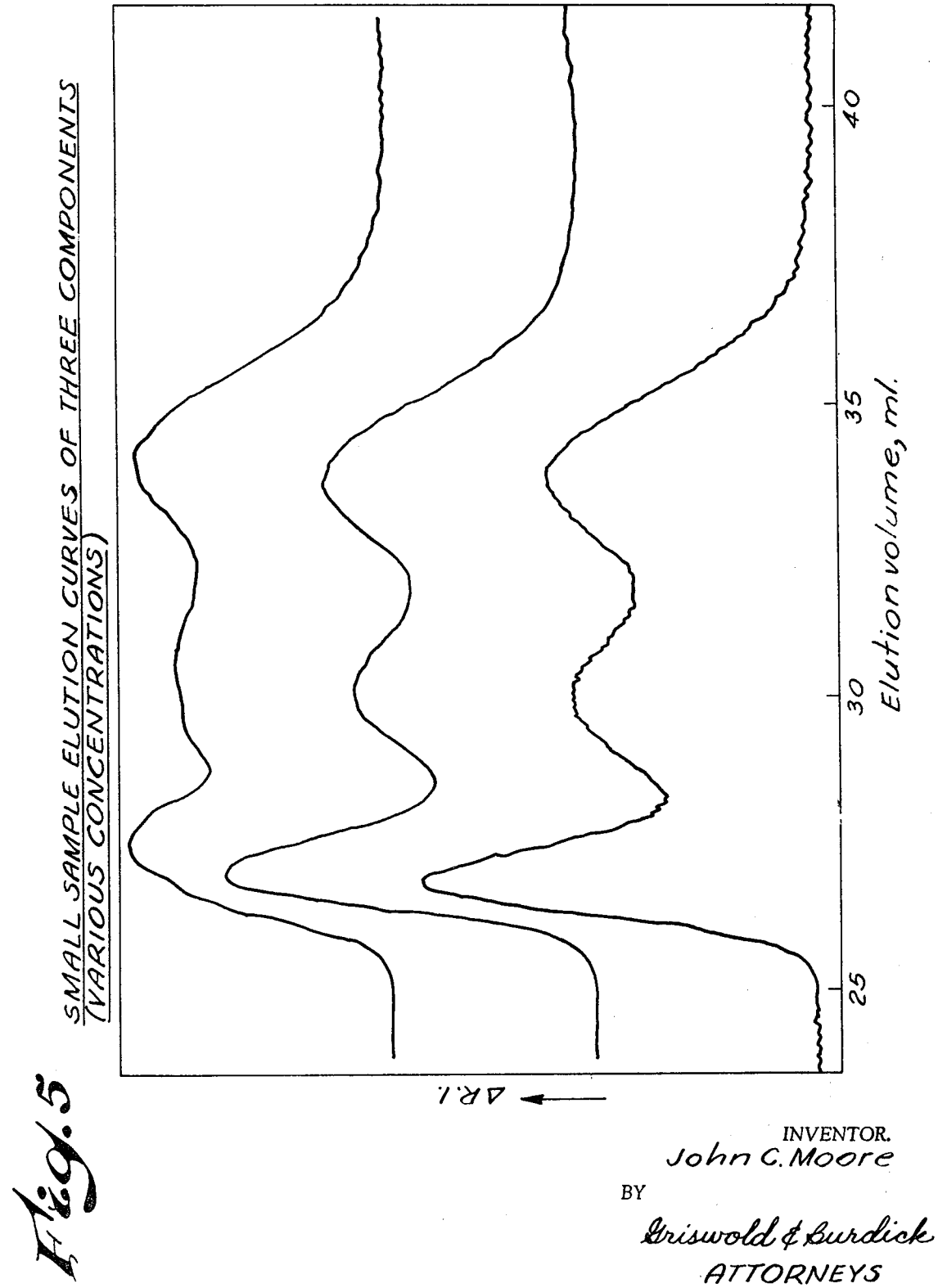
Fig. 5  SMALL SAMPLE ELUTION CURVES OF THREE COMPONENTS (VARIOUS CONCENTRATIONS)

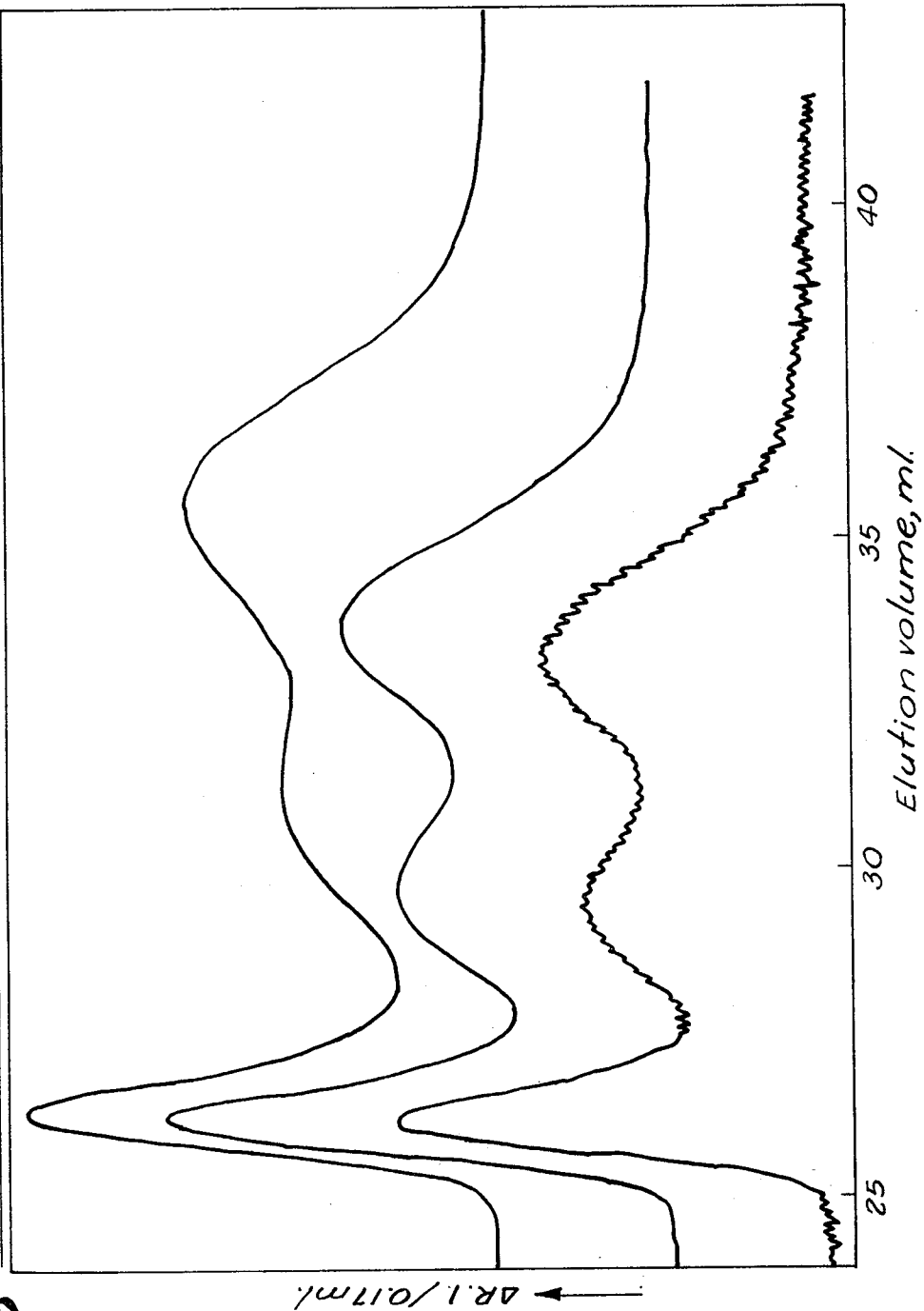

METHOD FOR ANALYSIS OF LARGE POLYMER MOLECULES

BACKGROUND OF THE INVENTION

This invention relates to the separation of large polymer molecules in solution and more particularly relates to an improved method for the analytical separation of polymer samples by means of a chromatographic method employing porous materials.

The separation of larger polymer molecules in solution by means of porous materials is now generally referred to as gel permeation chromatography (GPC). This technique has become widely accepted as a method of analyzing polymers, as a method of separating polymers into fractions by molecular size and as an analytical tool in the production of polymers. Unlike the older chromatographic techniques such as adsorption chromatography or ion exchange chromatography, gel permeation chromatography retards the smaller species more than the larger species of a given polymer series and therefore elutes the highest molecular weight materials first. Since both the results and the mechanism of separation are dissimilar to the adsorption and ion exchange techniques, some of the problems encountered are likewise dissimilar. Experience with the gel permeation separation process has shown that a relatively long column is required to achieve good separation efficiency and therefore 2 to 4 hours is usually required for the separation or analysis of a polymer sample, especially when large molecular species are present. Attempts to shorten the column and consequently shorten the analysis time have met with a disproportionate loss in accuracy. Separation efficiency varies sharply with load and, therefore, very dilute solutions of polymer have been employed since more concentrated solutions of polymer tend to overload the column and thereby severely impair the separation.

Using well-characterized narrow fractions of a polymer as samples, a column may be calibrated in terms of its separating and band-spreading characteristics by known methods. A "universal calibration" results when molecular size is expressed as hydrodynamic volume, that is, as the product of molecular weight and intrinsic viscosity. The molecular weight distribution of an unknown sample of a given polymer may then be obtained by finding that distribution which, when subjected to the known separating and band-spreading characteristics of the column, would have given the chromatogram. In all but the simplest cases this has been accomplished by iterative methods. For further discussion of the use of these methods refer to J. C. Moore, in "Characterization of Macromolecular Structure," Publication 1573, Nat. Acad. of Science, Washington, D.C. 1968, pp. 273–284 and L. H. Tung, J. C. Moore and G. W. Knight, J. Appl. Polymer Sci. 10, 1261(1966).

It is preferred to have the heteroporous packing match the size range of polymer molecules being analyzed. Thus, the heteroporous packing is selected by referring to a calibration curve which indicates the range of molecular sizes separable by the given packing. If the range of molecular size of the polymer sample is unknown, the particular packing material may be selected by a trial run of the sample through one or more known packing materials.

It is to be understood that porous material of any range of sizes (i.e., porosity) can be used so long as this range includes the range of pore sizes which will make the desired separation.

Gel permeation chromatography columns have heretofore been operated by passing a relatively small volume of dilute solution of a sample of polymer into a column packed with heteroporous material and filled with solvent. After the sample has been injected into the column, additional solvent is injected to force the sample through the column whereby separation occurs. The solution then passes from the column to an analytical means such as a differential refractometer.

In all forms of chromatography using small samples, as the sample is carried through the column both the separation process and certain zone broadening processes spread the concentration profile so that it becomes lower and broader. It has been observed in GPC that the small increase in sample viscosity due to the presence of long chain molecules presents an instability in the sample cross section at the trailing boundary of the sample. The more fluid solvent tends to flow more rapidly than the relatively viscous polymer solution through the small openings between the particles of packing. This effect is called "viscous fingering" and can occur throughout the sample zone where ever a less viscous fluid displaces a more viscous one. This process results in "back mixing" and loss of efficiency. This effect is shown on the chromatogram as an irregular tailing of components and produces a larger decrease in column efficiency under the main body of the eluted peak. This phenomenon is responsible for the marked effect of sample concentration on the separations shown in FIGS. 4 and 5, which will be more fully discussed later. These effects seem to be peculiar to gel permeation chromatography separations and are relatively more serious as the length of the columns is reduced.

It is an object of this invention to provide an improved method for the analysis of various high-molecular weight components of a polymer.

A further object of the invention is to provide a method which permits a more precise analysis of polymer components at increased polymer concentrations in the solvent.

A still further object of the invention is to provide more rapid chromatographic analysis of polymers than has heretofore been possible without losing efficiency.

These and other objects and advantages of the present invention will become apparent from the following detailed specification.

BRIEF DESCRIPTION OF THE INVENTION

I have now discovered that when a relatively large sample of a dilute solution of a polymer is introduced into a GPC column filled with the same solvent used to dissolve the sample and flow is continued until all of that solvent is displaced by the solution of sample, a transition zone occurs between solvent and solution, in which zone the concentration of polymer molecules varies according to molecular size.

Thus, by using a sample large enough to produce a rise in polymer concentration in the eluate of from zero to the concentration of the sample, a complete and more accurate analysis of the molecular size distribution in the sample can be obtained. The rising concentration of polymer in the eluate provides a condition in which the eluted solution is continually increasing in viscosity and, therefore, viscous fingering does not occur.

It has been found and will be demonstrated in the appended examples that the separation processes of GPC are at work in this transition zone and that analysis of the data from this transition zone gives a molecular size distribution of the sample.

Having found how to overcome the problem of "viscous fingering," a previously unrecognized load effect was discovered. Mutual compression of the long chain molecules, such that their effective size diminishes as their environmental concentration increases, results in a delay in their elution beyond that point at which they are expected. This shows up especially when samples of two or more different average molecular weight polymers are used and in more highly concentrated solutions of polymers. In making an analysis by means of examining the transition zone referred to above, which can also be referred to as frontal analysis, the effect caused by mutual compression of the large molecules, which will be called "viscous delay," can be correlated with solution properties and the chromatogram can be corrected by appropriate mathematics.

An expression which took into account a combination of molecular compressibility and solution concentration enabled the prediction of the compression for each molecular species. This compression factor was applied to compensate for the "viscous delay."

DETAILED DESCRIPTION OF THE INVENTION

Figure 4:
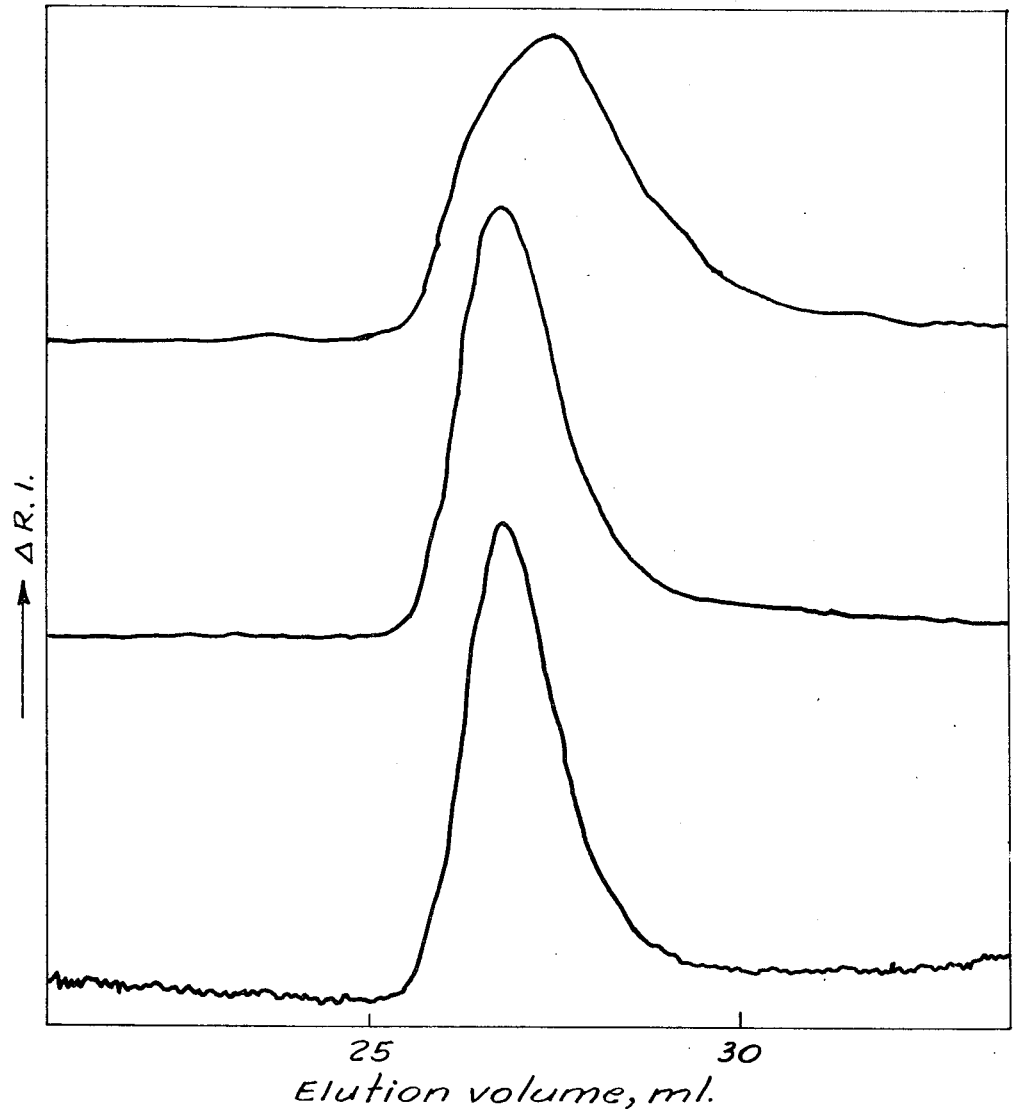

In the practice of the present invention the effluent solution from the column is passed to an analyzer such as a differential refractometer. The refractive index of the solution relative to the pure solvent may be plotted to give a curve such as that shown in FIG. 1. The data from the transition zone (between 27 ml. and 35 ml.) may be converted by known methods to a differential curve such as that shown in FIG. 2 from which the molecular weight distribution of the sample may be obtained.

Thus by employing frontal analysis techniques the problems of "viscous fingering" and sample size are eliminated and the effect of "viscous delay" becomes predictable so that a compensating factor can be applied to give a better analysis of the molecular size distribution in a polymer sample. Further, this analysis can be accomplished in a shorter period of time using solutions of normal concentration on short columns.

Since the method corrects problems which occur outside the pores of the column packing, the invention is not limited to the use of any particular packing or eluting materials.

Suitable column packing for use in the process of this invention are nonpolar polymeric materials having a controlled and selected heteroporosity such as are described in U.S. Pat. No. 3,326,875 and *J. Polymer Sci.* 62, 301 (1962). Other materials such as porous glass, silica, alumina, or any packing suitable for GPC as previously practiced may be used. Porous polymers suitable for use as GPC column packings have been disclosed in a copending U.S. Pat. application Ser. No. 696,131, filed Jan. 8, 1968, in which dextrans, polyethylenimines and the like are separated on a heteroporous copolymer of acrylamide or methacrylamide and alkylidenebisacrylamide. The process of the present invention is also applicable in separating these water soluble polymers.

It is expedient to have the heteroporous packing cover, or match, the size range of the molecules being analyzed. This can be determined as known to those skilled in the art.

Suitable eluting solvents including toluene, diethylbenzene, benzene, chloroform, perchloroethylene, tetrahydrofuran, dimethylformamide, trifluoroethanol and metacresol are useful for conducting separations of various organic polymers on the nonpolar porous polymeric gels; while water, aqueous buffer solutions, organic solvent-water mixtures (e.g., alcohol-water, acetone-water-chloroform), dimethyl formamide and dimethyl sulfoxide are useful in conducting separations of water soluble type polymers. In general a solvent is useful if it dissolves the polymer and matches the polarity of the gel well enough, or differs from it in the right direction so that retention (delay) of the sample components does not occur by adsorption or preferential solvation, and the elution of the sample occurs in the order of decreasing molecular size. These requirements are well known to those skilled in the art of gel permeation chromatography.

Substantially any polymer which is soluble in a useable solvent may be analyzed by the process of this invention. Such polymers include polyolefins such as polyethylene and polypropylene, polyglycols, polystyrene, polyvinyl chloride, polyesters, polyamides, alkyd resins, synthetic rubbers, cellulose ethers, cellulose esters, polyacrylic acid salts, polyamines, and the like.

Where a recording differential refractometer is employed for analysis of fractions eluted during the practice of this process, the elution curve is equivalent to the integral of the usual small sample elution curve (See FIG. 1). Such curve may then be differentiated graphically or analytically (See FIG. 2A). In standard practice, effluent solution from the chromatographic column is passed through one side of the differential refractometer while a material (usually the solvent) having a constant refractive index is passed through the other side. In a preferred embodiment of this invention, however, the differential curve is produced directly by the recording differential refractometer by passing the eluate solution from the sample side of the cell through a short capillary delay line and then through the reference side of the cell (FIG. 3).

The volume of the loop carrying the eluate from the sample side of the refractometer cell to the reference side depends upon the resolution desired to obtain the useful data available in the chromatogram and the need to keep "noise" at a minimum. The loop volume is conveniently about 1 to 2 percent of the pore volume of the gel.

In the practice of the present invention a molecular size distribution of a polymer is obtained by (1) passing a sample of a dilute solution of the polymer through a column containing heteroporous packing material, wherein the sample has a volume sufficient to give a rise in the concentration of polymer in the eluate of from zero to that of the sample, (2) measuring this rise in concentration as a function of elution volume, (3) differentiating this series of measurements to obtain the molecular size distribution of the polymer and (4) applying a factor to this distribution to correct for band spreading and concentration (or load) effects to obtain a more accurate molecular size distribution of the polymer.

In applying this method to process control of a polymerization reaction a dilute solution of the reaction product, or of the reaction medium during the course of the reaction, can be passed through a column of porous material (which matches the size of the polymer product molecules) to obtain a frontal rise of concentration in the eluate up to that of the sample. The concentration rise is measured as a function of eluate volume and these data are compared to like data identically obtained from a standard sample of the desired product. From this information the process parameters can be adjusted as necessary to obtain the desired product.

The measurement of concentration and volume can be taken in increments or the measurement can be made in a continuous manner as is the case when the eluate is conducted through a differential refractometer.

The following examples are representative of the method of the invention.

EXAMPLE 1

In this experiment, a standard 48×⅜ inch O.D. column packed with $3\times10^3$ A. permeability gel was employed. The column efficiency was 1,900 plates per foot as determined with a very small benzene sample. A continuous differential refractometer was employed in combination with a recorder having a chart speed of 30 inches per hour to monitor the eluate concentration.

A sample of 25 ml. of a solution containing 0.25 mg./ml. of a polystyrene having a average molecular weight of 411,000 in tetrahydrofuran was continuously introduced into the column at a temperature of 25° C. and a flow rate of 1 ml. per minute until the curve produced by the recorder became flat showing that full sample concentration had been reached. The curve thus produced, shown in FIG. 1, was differentiated by the graphical method to produce the curve shown in FIG. 2A which curve is equivalent to the normal elution curve of a small sample (0.8 ml.) of the same polystyrene shown in FIG. 2B.

In each of the following examples the conditions of temperature and flow rate were the same as in Example 1.

EXAMPLE 2

A modification of the refractometer was made by connecting the two sides of the cell with a 235 mm. length of one-sixteenth inch stainless steel tubing having an inside diameter of 0.037 in. and an internal volume of 0.17 ml. By this means the effluent from the sample side of the cell was passed through the reference side. In this manner the differential curve was produced directly. FIG. 3 shows the results obtained by this modification when using a sample of the same polymer as used in Example 1.

EXAMPLE 3

Viscous fingering and the effect of concentration are shown in FIG. 4. Using the same chromatographic column as in Example 1, three separate (0.8 ml.) samples of a polystyrene, having a weight average molecular weight of 1,800,000, in tetrahydrofuran were injected. The first (lower curve) contained 0.0625 mg./ml. of polymer; the second (middle curve) contained 0.250 mg./ml. of polymer; and the third (upper curve) contained 1,00 mg./ml. of polymer. Peak broadening is noticeable in the middle curve, but the peak occurs at essentially the same point as in the lower curve, about 26.0 ml. The sample of highest concentration, however, shows a distinct skewing of the curve and a shift of the peak to the right at 26.8 ml., a pronounced tailing effect and a bump in the curve occurring after the major peak.

Thus, viscous fingering is shown to cause errors in the chromatogram as concentration increases. With larger samples the effect is still more pronounced.

EXAMPLE 4

A. Employing the method of Example 3, in which a small sample (0.8 ml.) was used, a mixture of equal weights of three different polystyrenes, having weight average molecular weights of 173,000, 411,000 and 1,800,000, respectively, was chromatogrammed. Three runs were made in which the concentrations with respect to each component were 0.0625, 0.25 and 1.00 mg/ml., respectively. That is, the first run contained 0.0625 mg./ml. of each of the three polystyrenes, or a total of 0.1875 mg./ml. of the polymers. The second and third runs similarly contained a total of 0.75 and 3.0 mg./ml. of the polymers, respectively. The results, seen in FIG. 5, show the errors introduced by viscous fingering as concentration is increased Note that the first peak, especially at the highest concentration (upper curve) is the most severely distorted. In fact, distortion is so great that a portion of the component molecules is eluted sufficiently late to obscure the second peak. This component (1,800,000 mw.) is the one excluded by the pores of the gel and, thus, shows that viscous fingering is an interstitial phenomenon.

B. A large sample (25 ml.) of the same mixture used in A above was passed through the same chromatographic column to obtain a frontal concentration rise. This rise was differentiated by the recording refractometer to give the three curves shown in FIG. 6. Here, the viscous fingering effect has been eliminated as shown by the lack of distortion of the first (highest m.w.) peak, even at the highest concentration. Another phenomenon associated with increasing concentration, however, is apparent. This is the "viscous delay" referred to earlier in the "description" sections which causes each species to elute from the column later then expected. Thus, in the case of an unknown, an erroneous reading is given as to its apparent molecular weight. Note that no delay occurs with the highest molecular weight component, the first peak, since even though mutual compression of the molecules occurs, none is yet compressed sufficiently to enter the pore structure and be delayed. The progressive delay becomes apparent with the second and third component peaks.

It has been found that the viscous delay effect can, at least as a first approximation, be formulated as a compression of molecular hydrodynamic volume, proportional to the product of (1) a mutual pressure or crowding factor, and (2) a compressibility factor for the particular molecular species whose viscous delay is being calculated. The crowding factor (1) may be taken as the specific viscosity of the solution - in very dilute solutions the sum of the products of the concentrations and the intrinsic viscosities of all the polymeric solutes. At present this compressibility must be experimentally determined for a given polymer and solvent. It has been observed that the molecular compressibility $CM_i$ shows an increase with molecular size and correlates with intrinsic viscosity by an empirical polynomial function; e.g., for polystyrene in tetrahydrofuran $$CM_i = \left(X \cdot [\eta]_i^{1/4} + Y \cdot [\eta]_i\right)\left(1 - \frac{0.0085}{[\eta]_i}\right)$$

where $X$ and $Y$ have values on the order of 0.7 and 0.2, respectively, and $[\eta]_i$ is the intrinsic viscosity of the molecular species $i$ whose viscous delay is being sought.

In an iterative correction for band-spreading in the chromatogram, it may be assumed for the first iteration that the viscous delay effect is negligible, and a distribution of molecular weights and relative concentrations will be obtained. Since in frontal analysis the eluted concentrations are cumulative, and the final concentration is that of the sample, the calculation may be caused to yield the cumulative specific viscosity at each point in the frontal chromatogram. Multiplying these values by the compressibility of the species whose mean is assumed to be located at each point, a series of compression factors results. Applying these to the hydrodynamic volumes of the assumed species, a new set of hydrodynamic volumes results, those of the compressed species which now appear later than their noload positions. The next iterative correction for band-spreading may then employ the intrinsic viscosities of the compressed species and their band-spreading effects for a new calculation of the distribution and the cumulative specific viscosity in the frontal chromatogram. After a few iterations a satisfactory agreement is obtained. Example 5 shows how such a calculation compensated satisfactorily for the viscous delay effect.

EXAMPLE 5

In order to show the effect of viscous delay, a series of chromatograms was obtained by running samples of each of two different molecular weight polymers through a short column (one-half the length of the column in the preceding examples) at various concentrations, using first small samples (1.0 ml.) and then large samples (25 ml.). The former produced normal elution curves in which viscous fingering effects are apparent, while the latter produced a frontal rise which was differentiated by the refractometer.

The chromatographic column employed for these experiments comprised two columns connected in series. The first was a stainless steel tube 7.8 mm. I.D. × 12 inches long packed with $10^6$ A. permeability styrene-divinyl benzene copolymer gel. The second column of the same size was packed with $10^4$ A. permeability gel. These were connected with a short length of stainless steel capillary tubing having a volume of 0.15 ml. When the frontal analysis curve was differentiated by the refractometer, a loop connecting the sample side with the reference side was used which had a volume of 0.26 ml.

Calculated molecular weights are shown in the table below which, in the case of the small samples, have been corrected for peak broadening effects, and in the case of the large samples, have additionally been corrected for the viscous delay. The factor applied to correct for viscous delay is the product of the specific viscosity and the compressibility factor indicated between Examples 4 and 5 above. The apparent molecular weight of the sample is shown for each concentration (without correction) for comparison with the corresponding molecular weights which have been corrected for viscous delay and peak broadening effects. The ratios of weight to number average molecular weight also are given to show the deviation from the known ratio for the original sample.

TABLE I

Small Sample Chromatogram (1.0 ml.)

| Concentration mg./ml. | Mol. Wt. | Mw/Mn | Mol. Wt. | Mw/Mn |
|---|---|---|---|---|
| 0.0625 | 1,825,479 | 1.156 | 428,532 | 1.054 |
| 0.25 | 1,741,363 | 1.241 | 412,185 | 1.054 |
| 1.0 | 1,421,612 | 1.726 | 383,463 | 1.084 |
| 1.5 | 1,262,251 | 1.979 | 386,387 | 1.128 |
| 2.0 | 1,092,383 | 2.858 | 364,740 | 1.260 |

TABLE II

Large Sample-Frontal rise-Chromatogram (25.0 ml.)

| Concentration mg./ml. | Molecular Weights | | | |
|---|---|---|---|---|
| | Uncorrected | Mw/Mn | Corrected | Mw/Mn |
| 0.0625 | 1,973,334 | 1.514 | 1,964,869 | 1.511 |
| 0.25 | 1,973,824 | 1.610 | 1,974,085 | 1.607 |
| 1.0 | 1,536,182 | 2.066 | 1,699,864 | 1.481 |
| 1.5 | 1,453,095 | 2.176 | 1,703,756 | 1.466 |
| 2.0 | 1,409,209 | 2.182 | 1,681,816 | 1.483 |
| 0.0625 | 416,446 | 1.127 | 412,637 | 1.109 |
| 0.25 | 413,806 | 1.096 | 411,923 | 1.054 |
| 1.0 | 371,203 | 1.182 | 412,710 | 1.053 |
| 1.5* | 357,678 | 1.280 | 413,504 | 1.053 |
| 2.0 | 336,393 | 1.406 | 411,189 | 1.059 |

*A Single run; all others are averages of two runs

The Mw./Mn. ratio for the original samples of polystyrene were 1.20 for the 1,800,000 and 1.05 for the 411,000 molecular weight samples.

Note the small change in apparent molecular weight and in the Mw./Mn. ratio for the low-molecular species as compared to that for the high-molecular species as concentration increases in the small sample runs in Table I. The method of the present invention permits the more accurate determination of molecular weight distribution as shown by the relatively constant apparent molecular weight and Mw./Mn. ratio for both high- and low-molecular species as shown in the "corrected" columns of Table II. The method of this invention, thus enables the use of samples of higher concentration and therefore better resolution of minor components in the analysis of high polymers.

I claim:

1. The method of analyzing a polymer for its molecular size distribution by means of gel permeation chromatography in which a dilute solution of polymer is passed through a porous packing material which comprises:
   1. passing a sample of said polymer solution through said packing, wherein said sample has a volume sufficient to produce a rise in concentration of polymer in the eluate of from zero to the concentration of the sample,
   2. measuring said rise in concentration as a function of the volume of said eluate,
   3. differentiating said measurement to obtain a molecular size distribution of said polymer and
   4. applying a factor to said distribution to correct for band spreading and load effects.
2. The method of claim 1 wherein the measurement of concentration rise is obtained by a differential refractometer.
3. The method of claim 2 wherein the differentiation is obtained by conducting the eluate first through the sample side of the refractometer and then, by means of a short capillary delay line, through the reference side of the refractometer.
4. The method of claim 1 wherein the measurement of concentration rise is incremental.
5. The method of controlling a polymerization reaction by means of gel permeation chromatography which comprises,
   1. providing a column containing a porous packing material wherein the pores of said material match the size of the molecules of the polymer formed in said reaction,
   2. passing a sample of a dilute solution of the product of said reaction through said porous packing material to obtain a frontal rise of eluate concentration of polymer of from zero to the sample concentration,
   3. detecting and measuring said frontal rise of concentration and
   4. changing the reaction conditions to obtain the desired polymerization.
6. The method of claim 5 wherein the means of detecting and measuring the frontal concentration rise is a differential refractometer.

* * * * *